Patented Aug. 9, 1949

2,478,874

UNITED STATES PATENT OFFICE 2,478,874

CHEMOTHERAPEUTIC AGENTS

Gustav J. Martin and Harold Urist, Philadelphia, Pa., assignors to The National Drug Company, Philadelphia, Pa., a corporation of Pennsylvania No Drawing. Application March 15, 1948,
Serial No. 15,043

3 Claims. (Cl. 260—239.6)

Our invention relates to new chemotherapeutic agents, more particularly, to the novel compound, 4 - [{(2,4 - dihydroxy - 6 - pteridyl) methyl}-amino]benzenesulfonylamide and its salts.

We have discovered that the foregoing compounds are effective displacing agents for folic acid, a member of the vitamin B complex. They differ in chemical constitution from the folic acid in several respects. First of all, they contain a benzenesulfonylamide radical in place of the benzoyl glutamic acid radical of the folic acid. Furthermore, they possess an hydroxy group in the 2-position of the pteridyl nucleus, instead of an amino group. Despite these substantial differences in chemical constitution, they possess valuable therapeutic properties owing to their ability to displace the folic acid, thereby inhibiting bacterial growth.

We have also found that the 4-[{(2,4-dihydroxy - 6 - pteridyl) methyl}amino]benzenesulfonylamide and its salts are highly effective blood pressure depressants. When injected intravenously in dosages of from 1 to 5 milligrams, they will produce a prompt drop in blood pressure of from 30 to 100 mm. Hg, and will sustain this drop in blood pressure for from 10 minutes to 2½ hours.

Our new therapeutic agents may be administered orally as well as injected intravenously, subcutaneously and intramuscularly. When administered orally, considerably larger doses are required to achieve the same results as when injected. They may be mixed with the usual extenders and put up in convenient tablet form for oral administration, or stable, aqueous solutions of the salts may be put up in ampule form for injection purposes.

We have prepared our novel compounds by the condensation of sulfanilamide, acrolein dibromide and 5,6-diaminouracil. Equimolecular proportions of these reagents are condensed, but it is sometimes desirable to employ an excess of the acrolein dibromide and/or the 5,6-diaminouracil. The condensation is preferably effected in a buffered aqueous solution at room temperature. It may be carried out in a single step or in two stages, in the first of which the acrolein dibromide and the 5,6-diaminouracil are condensed, followed by the second stage wherein the condensation product thus obtained is condensed with the sulfanilamide. In place of the free 5,6-diaminouracil, one may conveniently use its salts, such as the bisulfate, sulfite and bisulfite.

The water-insoluble, crude reaction product may be purified by refluxing with methanol, dissolving in a dilute, aqueous, caustic alkali solution, filtering, and reprecipitating the purified product from the filtrate by the addition of a dilute mineral acid. This product is the 4-[{(2,4-dihydroxy - 6 - pteridyl) methyl}amino]benzenesulfonylamide. The various salts may be prepared therefrom in the usual manner by treating it with acids or bases. Among the simple salts that we have prepared and have found to be effective, there may be mentioned the sodium and potassium salts, as well as the hydrochloride and hydrosulfate. These are readily soluble in water. Obviously, other salts, such as the ammonium salt, the phosphate, hydrosulfite, etc. may be similarly prepared and will likewise be effective as therapeutic agents, provided they can be dissolved and are not toxic.

The following example will aid in a full understanding of our process. Other suitable methods for preparing our novel chemotherapeutic agents will doubtlessly be apparent to those skilled in the art. Obviously, the specific reaction conditions, proportions, etc., given in the example may be varied widely.

Example

A buffered solution was made up by mixing 66.9 grams of anhydrous sodium acetate with 54.4 grams of glacial acetic acid and diluting the mixture with water to form 1 liter of solution. To 1200 cc. of such a buffered solution there were then added 34.4 grams (0.2 mole) of sulfanilamide (para-amino-benzenesulfonylamide), 67.2 grams (0.2 mole) of 5,6-diaminouracil bisulfate, and 43.2 grams (0.2 mole) of acrolein dibromide. This mixture was then stirred for five hours at room temperature and allowed to stand overnight. On the following morning, the brown precipitate which had formed was filtered out and dried in the air. This crude reaction product was refluxed with methanol, collected by filtration, washed with methanol, and again dried in the air. It was further purified by dissolving it in a dilute aqueous solution of sodium hydroxide, filtering out undissolved impurities, and then reprecipitating it by the addition of dilute hydrochloric acid. There were thus obtained 6.0 grams of a brown powder of indeterminate melting point constituting the desired 4-[{(2,4-dihydroxy-6-pteridyl) methyl}amino]benzenesulfonylamide.

We claim:

1. Chemotherapeutic agents comprising a compound selected from the group consisting of 4 - [{(2,4 - dihydroxy - 6 - pteridyl) methyl}-amino] benzenesulfonylamide and its salts.

2. 4 - [{(2,4 - dihydroxy - 6 - pteridyl) methyl}-amino]benzenesulfonylamide.

3. The alkali metal salts of 4-[{(2,4 - dihydroxy - 6 - pteridyl) methyl}amino]benzenesulfonylamide.

GUSTAV J. MARTIN.
HAROLD URIST.

No references cited.